US011798590B2

(12) United States Patent
Pflaum

(10) Patent No.: US 11,798,590 B2
(45) Date of Patent: Oct. 24, 2023

(54) DATA RECORDING ON CERAMIC MATERIAL

(71) Applicant: Ceramic Data Solutions GmbH, Gmunden (AT)

(72) Inventor: Christian Pflaum, Bernried (DE)

(73) Assignee: Ceramic Data Solutions GmbH, Gmunden (AT)

( * ) Notice: Subject to any disclaimer, the term of this patent is extended or adjusted under 35 U.S.C. 154(b) by 0 days.

(21) Appl. No.: 17/936,628

(22) Filed: Sep. 29, 2022

(65) Prior Publication Data

US 2023/0022788 A1 Jan. 26, 2023

Related U.S. Application Data

(63) Continuation of application No. PCT/EP2021/069827, filed on Jul. 15, 2021.

(30) Foreign Application Priority Data

Aug. 11, 2020 (EP) ..................... 20190446

(51) Int. Cl.
*G11B 7/0045* (2006.01)
*G11B 7/243* (2013.01)
*G11B 7/126* (2012.01)
*G11B 7/253* (2013.01)

(52) U.S. Cl.
CPC .......... *G11B 7/243* (2013.01); *G11B 7/00456* (2013.01); *G11B 7/126* (2013.01); *G11B 7/253* (2013.01); *G11B 2007/24302* (2013.01)

(58) Field of Classification Search
None
See application file for complete search history.

(56) References Cited

U.S. PATENT DOCUMENTS

| 4,069,487 A | 1/1978 | Masanao et al. |
| 4,214,249 A | 7/1980 | Kasai et al. |
| 4,556,893 A | 12/1985 | Rinehart et al. |
| 4,797,316 A | 1/1989 | Hecq et al. |
| 5,063,556 A | 11/1991 | Chikuma |
| 5,761,111 A | 6/1998 | Glezer |
| 6,039,898 A | 3/2000 | Glushko |
| 6,120,907 A | 9/2000 | Tahon et al. |
| 6,133,986 A | 10/2000 | Johnson |
| 6,143,468 A | 11/2000 | Ohno et al. |

(Continued)

FOREIGN PATENT DOCUMENTS

| CN | 110653494 A * | 1/2020 |
| DE | 19724214 | 12/1998 |

(Continued)

OTHER PUBLICATIONS

Venketakrishnan et al., "Laser writing techniques for photomask fabrication using a femtosecond laser", Appl. Phys. A, vol. 74 pp. 493-496 (2002).*

(Continued)

*Primary Examiner* — Martin J Angebranndt
(74) *Attorney, Agent, or Firm* — Lewis & Reese, PLLC

(57) ABSTRACT

The present invention relates to a method for recording data in a layer of a ceramic material and to a device for recording data in a layer of a ceramic material.

20 Claims, 4 Drawing Sheets

(56) References Cited

U.S. PATENT DOCUMENTS

| | | | |
|---|---|---|---|
| 6,171,730 B1* | 1/2001 | Kuroda | G03F 7/70325 430/5 |
| 6,340,543 B1* | 1/2002 | Nagamura | G03F 1/74 430/5 |
| 10,181,336 B1 | 1/2019 | Georgiou et al. | |
| 10,315,276 B2 | 6/2019 | Wagner et al. | |
| 10,719,239 B2 | 7/2020 | Rowstron et al. | |
| 11,007,606 B2* | 5/2021 | Kunze | C23C 14/5873 |
| 2003/0186624 A1* | 10/2003 | Koike | B24B 49/04 430/311 |
| 2003/0189228 A1 | 10/2003 | Ieong et al. | |
| 2005/0181089 A1 | 8/2005 | Ogawa et al. | |
| 2005/0208392 A1* | 9/2005 | Yamamoto | G03F 1/68 716/55 |
| 2006/0119743 A1 | 6/2006 | Lin | |
| 2006/0120262 A1 | 6/2006 | Kiyono | |
| 2006/0147841 A1* | 7/2006 | Ohmi | G03F 7/70425 430/311 |
| 2008/0320205 A1 | 12/2008 | Lunt et al. | |
| 2009/0207395 A1 | 8/2009 | Kasono | |
| 2009/0245077 A1 | 10/2009 | Ueda et al. | |
| 2010/0040960 A1* | 2/2010 | Piao | G03F 1/50 430/5 |
| 2010/0135147 A1 | 6/2010 | Bard et al. | |
| 2010/0151391 A1 | 6/2010 | Neogi et al. | |
| 2010/0289186 A1* | 11/2010 | Longo | B23K 26/0624 425/143 |
| 2011/0318695 A1 | 12/2011 | Hwang et al. | |
| 2015/0077535 A1 | 3/2015 | Izatt et al. | |
| 2015/0302926 A1 | 10/2015 | Shiozawa et al. | |
| 2015/0382476 A1 | 12/2015 | Zenou et al. | |
| 2016/0118077 A1 | 4/2016 | Lunt et al. | |
| 2016/0199935 A1 | 7/2016 | Chen et al. | |
| 2019/0273025 A1 | 9/2019 | Chen et al. | |
| 2019/0324240 A1 | 10/2019 | Shroff et al. | |
| 2019/0353912 A1 | 11/2019 | Chen et al. | |
| 2020/0142171 A1 | 5/2020 | Xiong et al. | |
| 2021/0252645 A1* | 8/2021 | Kunze | B23K 26/352 |

FOREIGN PATENT DOCUMENTS

| | | | | |
|---|---|---|---|---|
| DE | 102014118497 | | 6/2017 | |
| EP | 3031785 | | 10/2018 | |
| EP | 3955248 | | 2/2022 | |
| EP | 4044182 | | 8/2022 | |
| JP | H02-215587 | | 8/1990 | |
| JP | H02-277689 | | 11/1990 | |
| JP | 2002351055 | A * | 12/2002 | B23K 26/062 |
| JP | 2004-062981 | A | 2/2004 | |
| JP | 3913319 | B2 * | 5/2007 | G03F 1/32 |
| JP | 6689067 | | 4/2020 | |
| KR | 20010112497 | A1 * | 12/2001 | |
| WO | 91/13440 | | 9/1991 | |
| WO | 2021/028035 | | 2/2021 | |
| WO | 2022/002418 | | 1/2022 | |
| WO | 2022/002444 | | 1/2022 | |
| WO | 2022/033701 | | 2/2022 | |

OTHER PUBLICATIONS

Haight et al., "High resolution material ablation and deposition with femtosecond lasers and applications to photomask repair", J. Mod. Opt., vol. 51(16-18) pp. 2781-2796 (Dec. 2004).*

Morishige, Y., "High accuracy laser mask repair technology using ps UV solid state laser", 2nd Intern. Symp. Laser precis. Microfab. Proc SPIE 4426 pp. 416-423 (2002).*

Watanabe M., et al., "Three-Dimensional Optical Data Storage in Vitreous Silica," Japanese Journal of Applied Physics, JP, vol. 37, No. 12 B, part 02, Dec. 15, 1998.

International Search Report and Written Opinion regarding corresponding PCT Application No. PCT/EP2021/069827, dated Oct. 29, 2021.

Glezer, E. N., et al., "Three-Dimensional Optical Storage Inside Transparent Materials," Optics Letters, vol. 21, No. 24, Dec. 15, 1996, 3 pages.

Glezer E. N., et al., "Ultrafast-Laser Driven Micro-Explosions in Transparent Materials," Appl. Phys., Lett. 71 (7), Aug. 18, 1997, 3 pages.

Benton, David M., "Multiple Beam Steering Using Dynamic Zone Plates on a Micro-Mirror Array," Optical Engineering, 57 (7), 2018, 13 pages.

Extended European Search Report regarding corresponding EP Patent Application No. 20190446.3, dated Jan. 28, 2021.

Communication Pursuant to Article 94(3) EPC regarding corresponding EP Patent Application No. 20190446.3, dated Dec. 14, 2021.

Communication Pursuant to Article 94(3) EPC regarding corresponding EP Patent Application. No. 20190446.3, dated May 31, 2021.

Summons to Attend Oral Proceedings Pursuant to Rule 115(1) EPC regarding corresponding EP Patent Application No. 20190446.3, mailed Apr. 6, 2022.

Summons to Attend Oral Proceedings Pursuant to Rule 115(1) EPC regarding corresponding European Patent Application No. 20190446. 3, mailed Oct. 27, 2022.

Gustafsson, Mats G.L., "Nonlinear Structured-Illumination Microscopy: Wide-Field Fluorescence Imaging with Theoretically Unlimited Resolution," PNAS, vol. 102, No. 37, Sep. 13, 2005, pp. 13081-13086.

Qi, Z.B., et al., "A Comprehensive Study of the Oxidation Behavior of Cr2N and CrN Coatings," 544, 2013, pp. 515-520.

Webster's Ninth New Collegiate Dictionary; Merrian-Webster Inc.; Springfield, Mass, USA; 1990 (no month); excerpt p. 224.

"Glass Composition, Glass Types," retrieved Dec. 17, 2020 from website ://glassproperties.com/glasses.

* cited by examiner

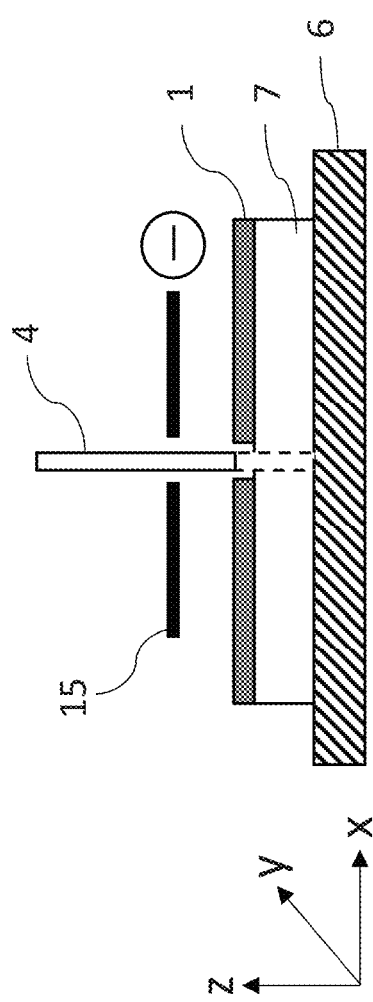
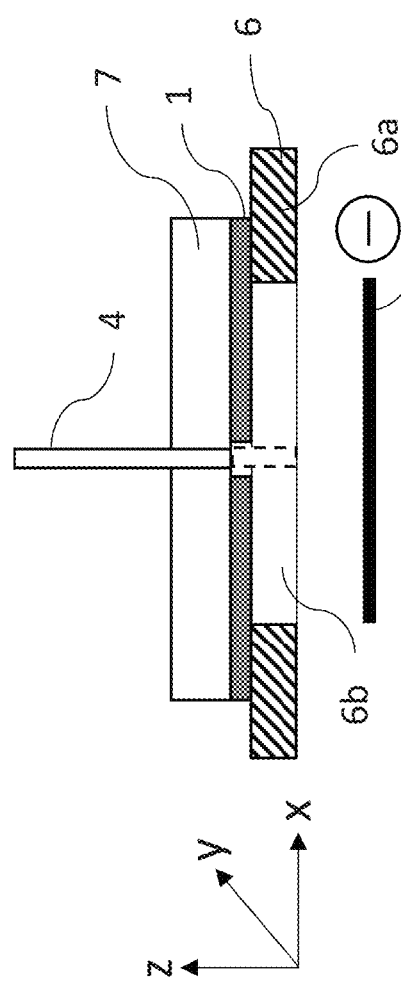

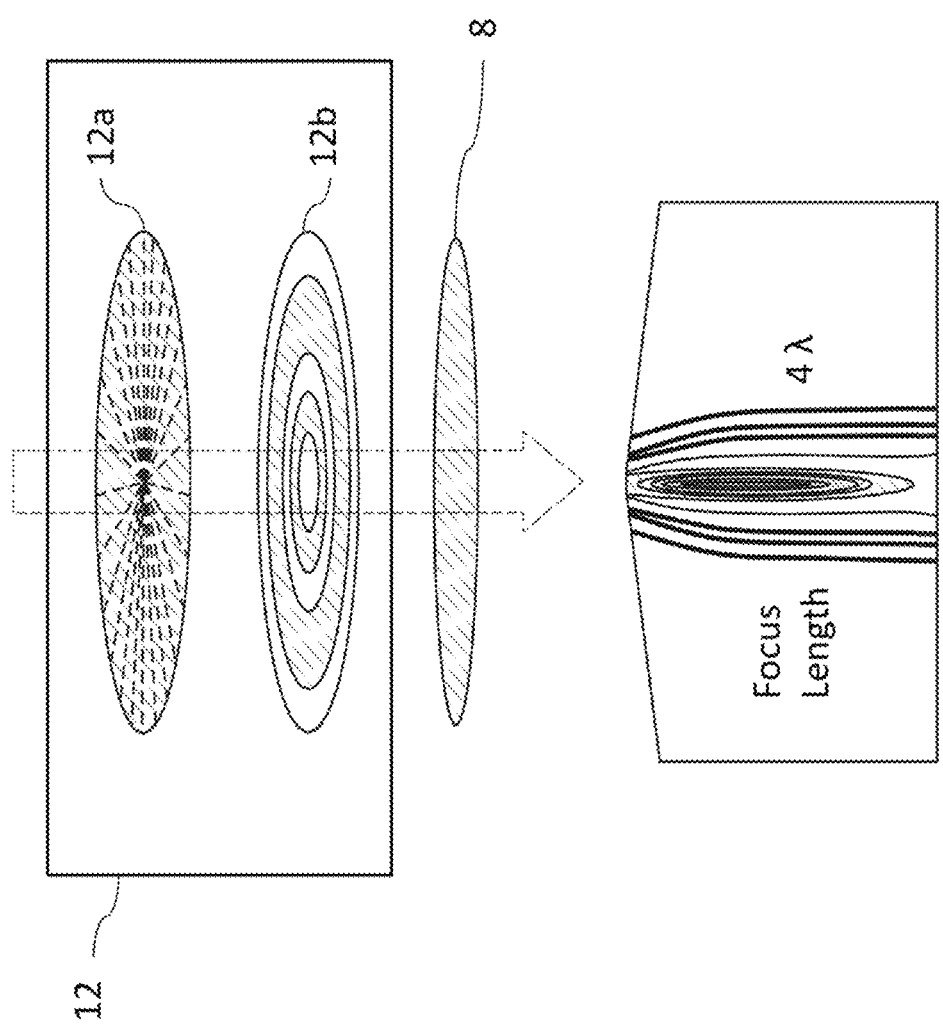

DATA RECORDING ON CERAMIC MATERIAL

CROSS-REFERENCE TO RELATED APPLICATIONS

This is a continuation of International (PCT) application Serial No. PCT/EP2021/069827, filed Jul. 15, 2021, which claims priority to European Patent Application Serial No. 20190446.3, filed Aug. 11, 2020. Priority is claimed to these applications, and they are incorporated herein by reference in their entireties.

INTRODUCTION

The present invention relates to a method for recording data in a layer of a ceramic material and to a device for recording data in a layer of a ceramic material.

The applicant of the present invention has developed a method for long-term storage of information and a storage medium therefor (see Int'l (PCT) published patent applications WO 2021/028035 and WO 2022/002418). According to one aspect of said method for long-term storage of information, information is encoded on a writable plate comprising a ceramic material by using a laser beam to manipulate localized areas of the writable plate. While this method can, in principle, be performed with a laser beam having a fixed focal point by mounting the writable plate on an XY positioning system and moving those localized areas of the writable plate to the laser focus where encoding is to take place, said method is cumbersome and time-consuming.

U.S. Pat. Nos. 4,069,487 and 4,556,893 also disclose laser-recordable recording media utilizing recording layer materials such as metal oxides and metal carbides. However, recording in both cases is based on a rotating disc technology which is disadvantageous due to the slow recording process caused by the fact that one pit after the other along the recording spiral has to be created.

SUMMARY

It is thus an object of the present invention to provide an improved method for recording data in a layer of a ceramic material, which is suitable for recording a large amount of data in a relatively small amount of time.

Accordingly, the present invention relates to method, devices, and systems for recording data in a layer of a ceramic material. According to said method, a layer of a ceramic material is provided and a plurality of regions of the layer of the ceramic material are selectively illuminated with a laser beam using a digital micromirror device (DMD). The parameters of the laser beam and the time of illumination for each of the selected regions are configured so as to ablate each of the selected regions in order to record data in the layer of the ceramic material by creating recesses in the layer of the ceramic material.

The laser beam preferably originates from a picosecond laser or from a femtosecond laser. Utilizing a picosecond laser or a femtosecond laser is highly advantageous for generating well-defined recesses. The ablation technique disclosed in U.S. Pat. No. 4,556,893 utilizes a focused, modulated laser-diode beam which, depending on the laser power, creates pits or bubbles. Since the recording layer material is light absorbing said layer is locally heated and thus melts and/or vaporizes. These processes are, however, rather uncontrolled and typically lead to disadvantageous hole shapes. For example, a ring of molten and subsequently solidified material may be formed around the edge of the hole as also indicated in FIG. 4 of U.S. Pat. No. 4,556,893. This is not acceptable when creating extremely small recesses in order to increase data density as it is required to reproducibly create these recesses and to allow for reproducible read-out technology.

The inventor of the present invention has performed multiple experiments with different ablation techniques for ceramic materials. It has turned out that utilizing a picosecond laser or a femtosecond laser allows for generating extremely well-defined holes having a circular cross-section and a very sharp edge. It is believed that this is due to the ablation process initiated by a picosecond laser or a femtosecond laser. A picosecond or femtosecond laser pulse does not heat the ceramic material but rather interacts with the electrons of said material. It is assumed that a picosecond or femtosecond laser pulse interacts with outer valence electrons responsible for chemical bonding, which valence electrons are thus stripped from the atoms, leaving the latter positively charged. Given a mutually repulsive state between atoms whose chemical bonds are broken, the material "explodes" into a small plasma cloud of energetic ions with higher velocities than seen in thermal emission. This phenomenon is known as Coulomb explosion and clearly differs from regular laser ablation with e.g. nanosecond lasers, which heats the material on the surface to melt and evaporate leaving molten materials at the rim of the impact area. Coulomb explosion is a physical process, which is clearly restricted to the region of laser impact, whereas ablation caused by heat suffers from an ill-defined heat flow within the material. Therefore, said Coulomb explosions are ideal in terms of generating a huge number of tiny recesses which allows for a dramatic data density increase compared to known techniques. While good results can be achieved with a picosecond laser, the use of a femtosecond laser is advantageous in this regard. The laser thus preferably has a pulse duration of smaller than 10 ps, more preferably of smaller than 1 ps.

It is preferable that the fluence of each of the multiple laser beams emitted by the DMD is greater than 100 $mJ/cm^2$, preferably greater than 400 $mJ/cm^2$, more preferably greater than 800 $mJ/cm^2$, most preferably greater than 1 $J/cm^2$.

In the context of the present invention, the term "recess" relates to a hole, groove or indentation in the ceramic material. In other words, the recess forms a volume without any ceramic material being present. Said volume is in fluid communication with the atmosphere. In other words, each recess is open to the atmosphere and not covered or closed.

Such open recesses are advantageous vis-à-vis the technique described in U.S. Pat. No. 4,069,487 which utilizes a protecting layer covering the information recorded portion because an open recess allows for clean complete ablation of the material having been present within the recess before ablation. This is, in particular, important when creating extremely small recesses in order to increase data density as it is required to reproducibly create these recesses and to allow for reproducible read-out technology.

The DMD comprises an array or a matrix of micromirrors which allow to selectively illuminate predetermined pixels on the ceramic material by adjusting respective micromirrors of the array or matrix. Thus, a huge number of pixels on the ceramic material may be illuminated simultaneously and in a well-controlled manner, which can be easily automatized. Depending on the number of micromirrors present in the DMD, millions of selected regions (i.e. pixels) of the layer of the ceramic material can be manipulated simultaneously during a timespan which is sufficient to ablate one selected region in order to record data. Such digital micromirror devices are readily available and can be simply implemented into a recording device.

Preferably, the pixels on the ceramic material, i.e. the predetermined positions at a subset of which recesses may be formed, are arranged in a regular matrix or array, i.e. in a repeating two-dimensional pattern having a lattice structure or a lattice-like structure. Particularly preferred matrices or arrays comprise, e.g., a square pattern or a hexagonal pattern. Such matrices or arrays allow for an optimized data density, which is substantially greater than that of, e.g., a CD, DVD or Blu-Ray Disc, because the individual pixels or bits are not separated by a track pitch (e.g. 320 nm for Blu-Ray Disc), which is more than double the size of the individual pixel of bit dimension (e.g. 150 nm for Blu-Ray Disc). Traditional disc shaped recording media are also limited in terms of the maximum rotation speed than can safely be achieved during recording or reading. Thus, the write/read velocities achievable with such matrices or arrays are much greater than those possible with pits arranged in a spiral shape.

Preferably, the recesses have a circular cross-section. The recesses may extend only partially into the ceramic layer or may form through holes in the ceramic layer. In the former case, recesses or holes of different depths may be created, wherein each depth corresponds to a predefined bit of information as described in WO 2022/002418. For this purpose, the layer of the ceramic material may be illuminated with two or more laser pulses, wherein the micromirrors of the DMD are adjusted between subsequent pulses so as to achieve regions of the layer of the ceramic material which are (i) never illuminated, (ii) illuminated once with a single laser pulse, (iii) illuminated twice with two laser pulses and so on.

It has been shown in experiments before by the applicant that a layer of CrN with a thickness of 5 µm can be visibly and reliably manipulated by a single femtosecond laser pulse (see WO 2022/002418). Accordingly, the method of the present invention allows for encoding at least several thousands and up to a couple of millions pixels within several hundred femtoseconds. Thus, the recording speed of the inventive method is merely limited by the number of micromirrors of the DMD and the time required to adjust the micromirrors.

Preferably, the layer of the ceramic material is moved laterally or translated during recording, e.g. by means of an XY positioning system (with the z axis being perpendicular to the surface of the layer) such as a scanning stage. Thus, once an array or matrix of pixels has been recorded, an adjacent array or matrix of pixels may be recorded by simply moving the layer of the ceramic material to an adjacent area.

Accordingly, the inventive method preferably comprises the steps of selectively illuminating a plurality of regions within a first area of the layer of the ceramic material with the laser beam using the DMD, wherein the first area can be covered by the DMD; translating the layer of the ceramic material so that a second area different from the first area can be covered by the DMD; and selectively illuminating a plurality of regions within the second area of the layer of the ceramic material with the laser beam using the DMD.

If both the DMD and the XY positioning system are properly controlled, data recording speeds of at least 10 MB/s, preferably at least 100 MB/s, preferably at least 1 GB/s, and more preferably at least 10 GB/s can be achieved.

Preferably, the laser beam (i.e. the multiple laser beams emitted from the DMD) is focused onto the layer of the ceramic material by means of a lens (or more complex optics) having a high numerical aperture preferably a numerical aperture of at least 0.5, more preferably of at least 0.8. Preferably, immersion optics are used in order to further increase the numerical aperture. If immersion optics are being used the numerical aperture may be at least 1.0, preferably at least 1.2.

It is further preferred to utilize a beam shaping device to create certain beam shapes that are advantageous for data recording. For example, a matrix of laser zone plates may be transmitted by the multiple laser beams originating from the DMD. These laser zone plates may, for example, be adapted to create a needle-like Bessel beam for each of the multiple laser beams.

A Bessel beam has the advantage of a substantially increased depth of focus. While the focus length of a regular Gaussian beam is in the order of the wavelength of the focused light, the focus length which can be achieved with a Bessel beam amounts to at least 4 times the wavelength of the focus light. At the same time, the width of the focus is about one half of the focus width which can be achieved by a Gaussian beam.

In general, the size of the features which can be achieved by the inventive method (e.g. the diameter of a recess in the ceramic material) varies between ⅔ λ, (air) and ½ λ, (immersion) for a Gaussian beam and between ⅓ λ, (air) and ¼ λ, (immersion) for a Bessel beam (where λ is the wavelength of the laser light). Thus, the Bessel beam shape is advantageous in that smaller process features and, accordingly, a larger recorded data density can be achieved. Moreover, the increased focal length of the Bessel beam is advantageous in that, for example, deeper recesses may be generated. This is, in particular, of relevance if features of different depths are to be generated in order to encode information by means of, e.g., the depth of a recess. Since the focus of a Gaussian beam is cone-shaped, increasing the depth of a recess implies enhancing the diameter of the recess at the surface. By contrast, the more cylindrical focus of a Bessel beam allows for creating much deeper recesses with almost constant diameter.

Such Bessel beams may also be generated by means of other beam shaping devices. One particularly preferred example of a beam shaping device is a spatial light modulator, which is particularly versatile because it can be utilized to create Bessel beams, to allow for optical proximity control and to provide a phase-shift mask.

Preferably, the layer of the ceramic material comprises a metal nitride such as CrN, CrAlN, TiN, TiCN, TiAlN, ZrN, AlN, VN, $Si_3N_4$, ThN, HfN, BN; and/or a metal carbide such as TiC, CrC, $Al_4C_3$, VC, ZrC, HfC, ThC, $B_4C$, SiC; and/or a metal oxide such as $Al_2O_3$, $TiO_2$, $SiO_2$, $ZrO_2$, $ThO_2$, MgO, $Cr_2O_3$, $Zr_2O_3$, $V_2O_3$; and/or a metal boride such as $TiB_2$, $ZrB_2$, $CrB_2$, $VB_2$, $SiB_6$, $ThB_2$, $HfB_2$, $WB_2$, $WB_4$, and/or a metal silicide such as $TiSi_2$, $ZrSi_2$, $MoSi_2$, $WSi_2$, PtSi, $Mg_2Si$. Particularly preferred materials are $B_4C$, HfC, $Cr_2O_3$, $ZrB_2$, $CrB_2$, $SiB_6$, $Si_3N_4$, ThN, CrN and CrAlN. These materials provide sufficient hardness and resistance to environmental degradation for long term storage of the recorded data.

Preferably, the step of providing a layer of a ceramic material comprises providing a substrate and coating the substrate with the layer of the ceramic material, which is different from the material of the ceramic substrate. Thus, only a small amount of the possibly more expensive coating material is needed while structural integrity is achieved with a robust and potentially cheaper substrate. The layer of the ceramic material preferably has a thickness no greater than 10 µm, more preferably no greater than 5 µm, more preferably no greater than 2 µm, more preferably no greater than 1 µm, even more preferably no greater than 100 nm and most preferably no greater than 10 nm.

Preferably, the substrate has a thickness of less than 1 mm, preferably of less than 250 µm, more preferably of less than 200 µm and most preferably of less than 150 µm.

Furthermore, the use of a substrate may allow for generating optical contrast between the substrate (where a hole is generated in the coating) and the surrounding coating material. Accordingly, selectively illuminating a plurality of regions of the layer of the ceramic material with a laser beam using a digital micromirror device preferably comprises ablating sufficient material at each of the regions that the recesses extend towards the substrate. Preferably, the manipulation of the selected areas causes these areas to become distinguishable from the surrounding material. For some applications, this may comprise to achieve optical distinguishability. However, in other instances (in particular, if the encoded structures are too small) these areas may only be distinguished from the surrounding material by means of, e.g., a scanning electron microscope or measurement of another physical parameter change for example of magnetic, dielectric or conductive properties.

Preferably, the ceramic substrate comprises an oxidic ceramic, more preferably the ceramic substrate comprises at least 90%, most preferably at least 95%, by weight of one or a combination of: $Al_2O_3$, $TiO_2$, $SiO_2$, $ZrO_2$, $ThO_2$, MgO, $Cr_2O_3$, $Zr_2O_3$, $V_2O_3$. These materials are known to be particularly durable under various circumstances and/or to resist environmental degradation. Thus, these materials are particularly suitable for long-term storage under different conditions. It is particularly preferred that the ceramic substrate comprises one or a combination of: sapphire ($Al_2O_3$), silica ($SiO_2$), zirconium silicate ($Zr(SiO_4)$), zirconium oxide ($ZrO_2$), boron monoxide ($B_2O$), boron trioxide ($B_2O_3$), sodium oxide ($Na_2O$), potassium oxide ($K_2O$), lithium oxide ($Li_2O$), zinc oxide (ZnO), magnesium oxide (MgO).

Preferably, the ceramic substrate comprises a non-oxidic ceramic, more preferably the ceramic substrate comprises at least 90%, most preferably at least 95%, by weight of one or a combination of: a metal nitride such as CrN, CrAlN, TiN, TiCN, TiAlN, ZrN, AlN, VN, $Si_3N_4$, ThN, HfN, BN; a metal carbide such as TiC, CrC, $Al_4C_3$, VC, ZrC, HfC, ThC, $B_4C$, SiC; a metal boride such as $TiB_2$, $ZrB_2$, $CrB_2$, $VB_2$, $SiB_6$, $ThB_2$, $HfB_2$, $WB_2$, $WB_4$; and a metal silicide such as $TiSi_2$, $ZrSi_2$, $MoSi_2$, $WSi_2$, PtSi, $Mg_2Si$. These materials are known to be particularly durable under various circumstances and/or to resist environmental degradation. Thus, these materials are particularly suitable for long-term storage under different conditions. It is particularly preferred that the ceramic substrate comprises one or a combination of: BN, $CrSi_2$, SiC, and $SiB_6$.

Preferably, the ceramic substrate comprises one or a combination of Ni, Cr, Co, Fe, W, Mo or other metals with a melting point above 1,400° C. Preferably, the ceramic material and the metal form a metal matrix composite with the ceramic material being dispersed in the metal or metal alloy. Preferably, the metal amounts to 5-30% by weight, preferably 10-20% by weight of the ceramic substrate, i.e. the metal matrix composite. Particularly preferred metal matrix composites are: WC/Co—Ni—Mo, BN/Co—Ni—Mo, TiN/Co—Ni—Mo and/or SiC/Co—Ni—Mo.

The layer of the ceramic material is preferably coated directly onto the ceramic substrate, i.e. without any intermediate layer being present, so as to achieve a strong bond between the ceramic substrate and the layer of the ceramic material. The coated ceramic substrate is preferably tempered before and/or after recording in order to achieve such strong bonding. Tempering may generate a sintered interface between the ceramic substrate and the layer of the ceramic material. The sintered interface may comprise at least one element from both the substrate material and the ceramic material because one or more elements from one of the two adjacent layers may diffuse into the other layer of the two adjacent layers. The presence of the sintered interface may further strengthen the bond between the ceramic substrate and the layer of the ceramic material.

Preferably tempering the coated ceramic substrate involves heating the coated ceramic substrate to a temperature within a range of 200° C. to 4,000° C., more preferably within a range of 1,000° C. to 2,000° C. The tempering process may comprise a heating phase with a temperature increase of at least 10 K per hour, a plateau phase at a peak temperature for at least 1 minute and finally a cooling phase with a temperature decrease of at least 10 K per hour. The tempering process may assist in hardening the ceramic substrate and/or permanently bonding the ceramic material to the ceramic substrate.

Laser ablation of selected regions of the layer of ceramic material may reveal the underlying ceramic substrate leading to a (optically) distinguishable contrast of the manipulated area relative to the rest of the layer of ceramic material.

According to a particularly preferred embodiment of the present invention, the substrate is transparent to the wavelength of the laser beam. Preferably, the substrate has a transmission of at least 95%, more preferably of at least 97% and most preferably of at least 99% for light having the wavelength of the laser beam. The substrate may, for example, comprise a glassy transparent ceramic material or a crystalline ceramic material, like sapphire ($Al_2O_3$), silica ($SiO_2$), zirconium silicate ($Zr(SiO_4)$), zirconium oxide ($ZrO_2$), boron monoxide ($B_2O$), boron trioxide ($B_2O_3$), sodium oxide ($Na_2O$), potassium oxide ($K_2O$), lithium oxide ($Li_2O$), zinc oxide (ZnO), magnesium oxide (MgO).

A particularly suitable crystalline ceramic material is sapphire ($Al_2O_3$), silica ($SiO_2$), zirconium silicate ($Zr(SiO_4)$), zirconium oxide ($ZrO_2$), magnesium oxide (MgO).

Such a transparent material is particularly advantageous as it allows for selectively illuminating a plurality of regions of the layer of the ceramic material (coated onto the substrate) through the transparent substrate. Thus, any debris generated during recording is generated on a surface of the coated substrate opposite to the recording optics. Accordingly, said surface may be easily cleaned and/or cooled without affecting the recording optics.

Due to the high transmission factor of the transparent substrate material, the laser light does not interact with the substrate and simply passes therethrough in order to, e.g., ablate the coating only. In particular, the substrate material is not substantially heated by the laser beam.

Preferably, the laser beam (i.e., each of the multiple laser beams emitted from the DMD) has a minimum focal diameter no greater than 400 nm, more preferably no greater than 300 nm, even more preferably no greater than 200 nm, and most preferably no greater than 100 nm.

Preferably, the wavelength of the laser beam is smaller than 700 nm, preferably smaller than 650 nm, more preferably smaller than 600 nm, even more preferably smaller than 500 nm and most preferably smaller than 400 nm. Smaller wavelengths allow for creating smaller structures and, accordingly, greater data densities. Moreover, the energy per photon (quantum of action) is increased for smaller wave lengths.

The present invention further relates to a device for recording data in a layer of a ceramic material. The device comprises a laser source, a digital micromirror device (DMD) adapted to emit multiple laser beams, collimating optics for collimating laser light emitted by the laser source onto the DMD, a substrate holder for mounting a substrate, and focusing optics adapted for focusing each of the multiple laser beams emitted by the DMD onto a substrate mounted on the substrate holder. The fluence of each of the multiple laser beams emitted by the DMD is greater than 100 mJ/cm$^2$, preferably greater than 400 mJ/cm$^2$, more preferably greater than 800 mJ/cm$^2$, most preferably greater than 1 J/cm$^2$. The laser source preferably comprises a picosecond laser or a femtosecond laser. The laser source preferably has a pulse duration of smaller than 10 ps, more preferably of smaller than 1 ps.

All preferred features discussed above in the context of the inventive method may also be analogously employed in the inventive device and vice versa.

The power density of the laser beams is preferably adapted to manipulate a layer of a ceramic material sufficiently in order to record data on or in the layer of the ceramic material. Preferably, the power density of the laser beams allows for ablating the above-mentioned ceramic materials.

The focusing optics preferably comprises a lens (or more complex optics) having a high numerical aperture, preferably a numerical aperture of at least 0.5, more preferably of at least 0.8. If immersion optics are being used the numerical aperture may be at least 1.0, more preferably at least 1.2.

The device preferably further comprises a beam shaping device, preferably a matrix of laser zone plates or a spatial light modulator in order to create, e.g., a plurality of Bessel beams as discussed above. Such beam shaping device is preferably positioned before the focusing optics. In this case, preferably a plurality of lenses, preferably Fresnel lenses, are located directly behind the beam shaping device in order to focus, e.g., the Bessel beams.

At the substrate, each of the multiple laser beams preferably is a Bessel beam. At the substrate, each of the multiple laser beams preferably has a minimum focal diameter no greater than 400 nm, more preferably no greater than 300 nm, even more preferably no greater than 200 nm and most preferably no greater than 100 nm.

The substrate holder is preferably mounted on an XY positioning system such as a scanning stage. The device preferably comprises a processor configured for controlling the DMD and the XY positioning system so as to sequentially illuminate adjacent areas or pixel arrays of the substrate mounted on the substrate holder.

This processor (or an additional processing unit) is preferably adapted and configured to receive a set of data to be recorded (i.e., analogue or digital data such as text, numbers, an array of pixels, a QR code, or the like) and to control the components of the device (in particular, the DMD and the XY positioning system and optionally the beam shaping device) to perform the inventive method so as to record the received set of data on or in the layer of ceramic material.

Preferably, the wavelength of the laser source is smaller than 700 nm, preferably smaller than 650 nm, more preferably smaller than 600 nm, even more preferably smaller than 500 nm and most preferably smaller than 400 nm.

BRIEF DESCRIPTION OF THE DRAWINGS

Preferred embodiments of the present invention will be further elucidated with reference to the figures:

FIG. 2a schematically shows a first recording alternative;

FIG. 2b schematically shows a second recording alternative;

FIG. 4 shows a schematic view of a combination of a polarizer, a zone plate and a lens as well as a graph of the resulting beam shape and focal length along the axis of the laser beam.

DETAILED DESCRIPTION

Figure 1:
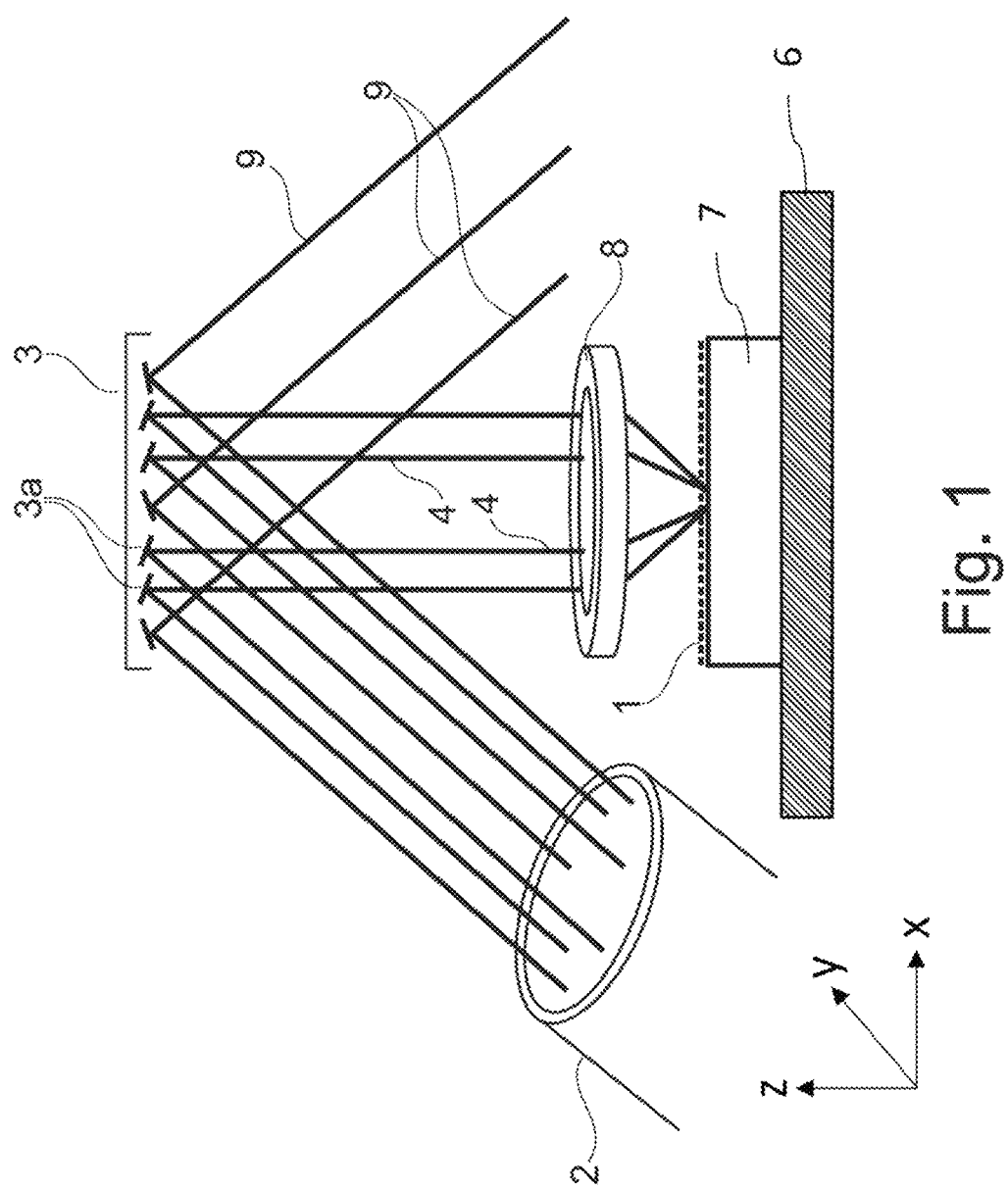
FIG. 1 shows a schematic view of a device for recording data according to a preferred embodiment.

FIG. 1 shows a schematic illustration of a device for recording data in a layer of a ceramic material according to a preferred embodiment of the present invention. The device comprises a laser source 2 emitting laser light onto a DMD 3 comprising multiple micromirrors 3a arranged in an array. The DMD 3 is adapted to emit multiple laser beams 4 along either a first direction (i.e., for recording) or along a second direction (indicated with reference numeral 9) for each micromirror being in an "off" state diverting those laser beams 9 into a beam dump (not shown). Usually, the device will further comprise collimating optics (not shown in FIG. 1) for collimating laser light emitted by the laser source 2 onto the DMD 3. The device further comprises a substrate holder 6 for mounting a substrate 7 and focusing optics 8 adapted for focusing each of the multiple laser beams 4 emitted by the DMD onto a substrate 7 mounted on the substrate holder. The focusing optics 8 may, for example, comprise standard microscope optics having a high numerical aperture. The substrate holder 6 is adapted for supporting and preferably mounting the substrate 7 and may be mounted onto or part of an XY-stage.

In the example shown in FIG. 1, the substrate 7 comprises a ceramic coating or a layer of a ceramic material 1 which is locally ablated by means of the focused laser beams 4. In FIG. 1, the ceramic coating 1 is provided on top of the substrate 7 (see also FIG. 2a). Alternatively, the ceramic coating may be provided on a bottom or back side of the substrate 7 as shown in FIG. 2b. Since the laser beams 4 in this case have to pass through the substrate 7, the material of the substrate 7 need be transparent for the wavelength of the laser light in this case. Moreover, in this case it is preferred that the substrate holder 6 comprises a frame 6a supporting the outer edge of the substrate 7 only (whereas the substrate may be fully supported in case of a top ablation as shown in FIG. 2a). Thus, the part of the ceramic coating 1 being exposed to ablation is not supported due to the free space 6b under that part (see FIG. 2b).

This is a particularly preferred embodiment because any debris generated during ablation will be separated from the focusing optics 8 by means of the substrate 7. Rather, any material being ablated from the ceramic layer 1 will be emitted into the free space 6b of the sample holder 6 and may be extracted or aspired therefrom. Thus, the focusing optics 8 will not be negatively affected by said debris and it is much easier to clean the surface of the ceramic coating 1 immediately after or even during recording.

Preferably, the thickness of the substrate is adapted to the focussing optics of the device being used. For example, the thickness of the substrate should be smaller than the focal length of the focussing optics in order to reach the ceramic coating.

Moreover, the arrangement shown in FIG. 2b does also allow for cooling the ceramic coating 1 during ablation, for example by letting a cooling fluid flow along said ceramic coating 1. This will improve accuracy of the ablation process because heat transfer from the laser focus to surrounding areas may be eliminated. For example, a cross jet of air (e.g., an air blade) or a liquid such as water or other immersion liquids may be provided for this purpose. Said cross jet may, in addition, drain off the debris generated during ablation.

Such a cross jet may also be provided in case of the arrangement shown in FIG. 2a. However, said cross jet in this embodiment has to be designed so as not to interfere with the optics. For example, if immersion optics is used the immersion liquid may be provided in a cross flow which is preferably laminar in order to avoid any optical effects due to turbulences within the immersion liquid.

Since such a cross jet of air or a liquid may generate vibrations which may jeopardize the recording accuracy and since it will be intricate to use a cross jet for the embodiment shown in FIG. 2a, it is preferred to provide a negatively charged mesh or sheet 15 as shown in FIGS. 2a and 2b. As explained above, the use of a picosecond or femtosecond laser will create a plasma in the ceramic material to be ablated. Simply speaking, parts of the atomic shells of the ceramic material will be removed due to the interaction with the laser pulses. The remaining, positively charged atomic cores are then expelled during a so-called Coulomb explosion. These positively charged atomic cores may then be attracted by the negatively charged mesh or sheet 15. This is particularly advantageous in case of the embodiment shown in FIG. 2a where the laser beams 4 may pass through an opening in the mesh or plate. All debris will then be collected by the charged mesh or plate and can, thus, not negatively affect, e.g., the focussing optics 8.

Figure 3:
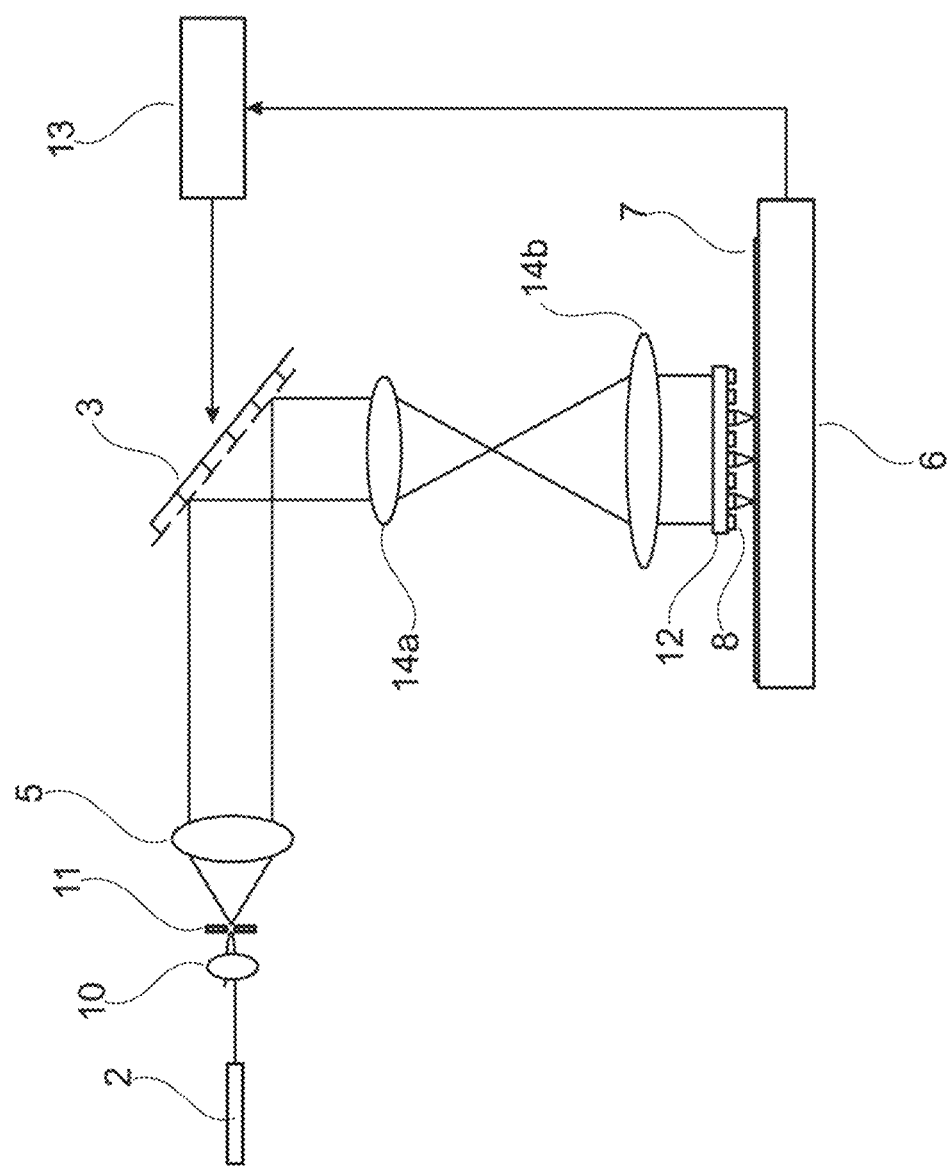
FIG. 3 schematically shows a device for recording data according to another preferred embodiment.

More details of another preferred embodiment of the inventive device are shown in FIG. 3. For example, FIG. 3 shows the collimating optics 5 for collimating laser light emitted by the laser source 2 onto the DMD 3 as well as further optical components such as a spatial filter 10, 11. The substrate holder 6 is, in case of FIG. 3, a XY positioning system for translating the substrate 7 along the x-y-plane (with z being perpendicular to the surface of the substrate 7). Both the DMD 3 and the XY positioning system 6 are controlled by a computer 13 which is configured to control the DMD 3 and the XY positioning system 6 so as to perform the following steps: selectively illuminating a plurality of regions within a first area of the layer 1 of the ceramic material with the laser beam using the DMD 3, wherein the first area can be covered by the DMD 3; translating the layer 1 of the ceramic material (i.e., the entire substrate 7 in the present case) so that a second area different from the first area can be covered by the DMD 3; and selectively illuminating a plurality of regions within the second area of the layer 1 of the ceramic material with the laser beam using the DMD 3.

As discussed previously, the device preferably comprises a beam shaping device to achieve, e.g., Bessel beams. For example, a matrix of laser zone plates 12 may be provided between the DMD 3 and the focusing optics 8 so as to shape each of the laser beams 4 (see FIG. 1) into a Bessel beam shape. Each Bessel beam is then focussed onto the substrate 7 by means of an attributed lens (e.g. Fresnel lens) 8. In order to properly illuminate the matrix of laser zone plates 12 additional collimating optics 14a and 14b may be provided. This principle is further elucidated in FIG. 4 which shows (for a single beamlet) how a Bessel beam is generated by a combination of an optical element 12a creating circularly polarized light and a binary phase element 12b for creating a Bessel beam which is then focused onto the substrate 7 by means of an attributed high NA lens 8 (or a Fresnel lens 8). As indicated also in FIG. 4, a focus length of at least 4 times the wavelength of the laser light may be achieved by using such a Bessel beam. Moreover, the focus has a much more cylindrical shape than a Gaussian beam.

What is claimed is:

1. A method for recording data in a layer of a ceramic material, the method comprising:
   providing a layer of a ceramic material; and
   using a computer to generate a set of non-analog, digital data to be written as a two-dimensional first matrix of first bits of digital information at predetermined positions;
   emitting at least one laser beam using a digital micromirror device;
   using the information generated using the computer to control the digital micromirror device to emit the at least one laser beam to record the first matrix of the first bits of digital information at the predetermined positions by selectively illuminating or not illuminating with the at least one laser beam regions of the layer of the ceramic material at the predetermined positions of the first matrix, thereby recording the first bits of digital information in a readable format in the first matrix;
   wherein parameters of the at least one laser beam and the time of illumination for each of the selected illuminated regions are configured so as to ablate circular recesses in the ceramic material in the first matrix, which are open to atmosphere, wherein the at least one laser beam originates from a picosecond laser or from a femtosecond laser;
   wherein providing the layer of the ceramic material comprises providing a substrate and coating the substrate with the layer of the ceramic material, which is different from the material of the substrate, wherein the layer of the ceramic material has a thickness no greater than 10 µm;
   wherein the layer of the ceramic material comprises at least one of: a metal nitride, a metal carbide, a metal oxide, a metal boride, and a metal silicide.

2. The method of claim 1, wherein the at least one laser beam is a Bessel beam.

3. The method of claim 1, wherein the layer of the ceramic material is moved laterally to record the readable first bits of digital information in the first matrix.

4. The method of any of claim 1, wherein the layer of the ceramic material has a thickness no greater than 1 µm.

5. The method of claim 1, wherein the substrate comprises at least 90% by weight of one or a combination of: $Al_2O_3$, $TiO_2$, $SiO_2$, $ZrO_2$, $ThO_2$, MgO, $Cr_2O_3$, $Zr_2O_3$, $V_2O_3$.

6. The method of claim 1, wherein the substrate has a thickness of less than 500 µm.

7. The method of claim 1, wherein the substrate has a thickness of less than 100 µm.

8. The method of claim 1, wherein the substrate is transparent to a wavelength of the at least one laser beam.

9. The method of claim 8, wherein the substrate comprises a glassy transparent ceramic material or a crystalline ceramic material.

10. The method of claim 8, wherein the substrate comprises one or a combination of: sapphire ($Al_2O_3$), silica ($SiO_2$), zirconium silicate ($Zr(SiO_4)$), zirconium oxide ($ZrO_2$), boron monoxide ($B_2O$), boron trioxide ($B_2O_3$), sodium oxide ($Na_2O$), potassium oxide ($K_2O$), lithium oxide ($Li_2O$), zinc oxide (ZnO), magnesium oxide (MgO).

11. The method of claim 8, wherein selectively illuminating the regions of the layer of the ceramic material with the at least one laser beam comprises illuminating the layer of the ceramic material through the transparent substrate.

12. The method of claim 1, wherein selectively illuminating the regions of the layer of the ceramic material with the at least one laser beam comprises ablating sufficient material at each of the regions that the circular recesses extend towards the substrate.

13. The method of claim 1, wherein the circular recesses are created at a subset of the predetermined positions in the first matrix.

14. The method of claim 1, further comprising collecting positively charged debris using a negatively charged mesh or sheet.

15. The method of claim 1, wherein the regions of the layer of the ceramic material are illuminated via focusing optics and wherein a distance between the focusing optics and the layer of the ceramic material is greater than 4 times a wavelength of a laser light of the at least one laser beam.

16. The method of claim 1, further comprising moving the ceramic material and repeating the steps of claim 1 to further record second bits of digital information non-analog, digital data to be written as a second matrix.

17. The method of claim 1, wherein the at least one laser beam comprises multiple laser beams.

18. The method of claim 17, wherein a fluence of each of the multiple laser beams emitted by the digital micromirror device is greater than 100 $mJ/cm^2$.

19. The method of claim 17, wherein the circular recesses in the layer of the ceramic material are created in an optical far-field of the multiple laser beams.

20. The method of claim 17, wherein, at the layer of the ceramic material, the multiple laser beams emitted by the digital micromirror device are Gaussian beams.

* * * * *